US008710342B2

United States Patent
Lin

(10) Patent No.: US 8,710,342 B2
(45) Date of Patent: Apr. 29, 2014

(54) STEPLESSLY ADJUSTABLE CYMBAL LOCATING DEVICE

(75) Inventor: Yi Hsien Lin, Taoyuan County (TW)

(73) Assignee: K.H.S. Musical Instrument Co., Ltd., New Taipei (TW)

( * ) Notice: Subject to any disclaimer, the term of this patent is extended or adjusted under 35 U.S.C. 154(b) by 115 days.

(21) Appl. No.: 13/417,682

(22) Filed: Mar. 12, 2012

(65) Prior Publication Data

US 2013/0174711 A1 Jul. 11, 2013

(30) Foreign Application Priority Data

Jan. 6, 2012 (TW) .............................. 101200316 A

(51) Int. Cl.
*G10D 13/02* (2006.01)

(52) U.S. Cl.
USPC .......................................... 84/422.3; 84/421

(58) Field of Classification Search
USPC ....................................................... 84/422.3
See application file for complete search history.

(56) References Cited

U.S. PATENT DOCUMENTS

| 4,363,561 | A | * | 12/1982 | Hsieh | 403/92 |
| 4,987,817 | A | * | 1/1991 | Diaz | 84/421 |
| 5,756,912 | A | * | 5/1998 | Liao | 84/421 |
| 6,239,343 | B1 | * | 5/2001 | Hoshino | 84/422.3 |
| 6,268,556 | B1 | * | 7/2001 | Liao | 84/421 |
| 7,348,480 | B1 | * | 3/2008 | Liao | 84/422.1 |
| 7,663,040 | B1 | * | 2/2010 | Hsieh | 84/421 |
| 2003/0039506 | A1 | * | 2/2003 | Chen | 403/96 |
| 2012/0210843 | A1 | * | 8/2012 | Sato | 84/422.3 |

* cited by examiner

*Primary Examiner* — Christopher Uhlir
(74) *Attorney, Agent, or Firm* — Rabin & Berdo, P.C.

(57) ABSTRACT

A steplessly adjustable cymbal locating device includes a housing having a first receiving space and a notch; a rotating mechanism having a second receiving space and being clamped in the first receiving space with the housing vertically rotatable relative to the rotating mechanism; a rotating pole partially clamped in the second receiving space with the rotating mechanism horizontally rotatable relative thereto; a fixed pole fixedly assembled to one side of the housing; and an adjustable locking subassembly extended into the housing and the rotating mechanism for selectively pressing the housing, the rotating mechanism and the rotating pole against one another to an immovably state or loosening them from one another to allow stepless adjustment of the locating device in two axis directions. Thus, a cymbal mounted on either the rotating or the fixed pole can be adjusted to any horizontal orientation and vertical angle according to a user's need.

16 Claims, 9 Drawing Sheets

STEPLESSLY ADJUSTABLE CYMBAL LOCATING DEVICE

FIELD OF THE INVENTION

The present invention relates to an adjustable percussion cymbal locating device, and more particularly to a steplessly adjustable cymbal locating device that allows fine adjustment of a cymbal mounted thereon in two axis directions.

BACKGROUND OF THE INVENTION

The currently commercially available cymbal locating structure mainly includes a pole, a fixed seat, a cymbal locating rod, and an adjusting knob. The pole is connected at a lower end to a set of stand legs, so as to stably stand on a surface. The fixed seat is assembled to an upper end of the pole and is formed on one side with a plurality of annularly arranged locating teeth. The cymbal locating rod is movably connected via a pivot block on its lower end to the fixed seat and has a cymbal fixedly fitted on an upper end thereof. The pivot block is formed on one side with a plurality of annularly arranged tooth sockets for engaging with or disengaging from the locating teeth on the fixed seat. With these arrangements, the cymbal locating rod can be set to different vertical angles relative to the fixed seat, and the cymbal can be changed to different angles when the cymbal locating rod is vertically rotated. The adjusting knob is extended into the pivot block and the fixed seat. By turning the adjusting knob to a pressing position, the locating teeth and the tooth sockets can be brought to tightly engage with one another to thereby fix the cymbal locating rod to an adjusted angle.

The design of changing the vertical angle of the cymbal locating rod through engagement of locating teeth with tooth sockets is often restricted by the number and the density of the locating teeth and tooth sockets provided. Therefore, the cymbal locating rod could not always be adjusted conveniently to reach a really desired angular position. That is, with the above-described conventional cymbal locating structure, it is not able to finely adjust the cymbal locating rod to accurate angular positions.

To overcome the disadvantage of the conventional cymbal locating structure in failing to allow fine angle adjustment, there was developed a steplessly adjustable cymbal locating structure as shown in FIGS. 1 and 2. The conventional steplessly adjustable cymbal locating structure includes a pole 1 having a fixed seat 2 and an immovable clamp disc 3 formed on the fixed seat 2; a clamper 4 mounted to the pole 1 and including a base 5 seated on the fixed seat 2 and a movable clamp disc 6 formed on the base 5 to face toward the immovable clamp disc 3; a cymbal locating rod assembly 7 including a friction disc 8 arranged between the immovable clamp disc 3 and the movable clamp disc 6 and a cymbal locating rod 9 outward projected from the friction disc 8; two friction washers 10, one of which being arranged between the immovable clamp disc 3 and the friction disc 8 while the other one between the movable clamp disc 6 and the friction disc 8; and a primary adjusting screw rod assembly 11 extended through the immovable clamp disc 3, the movable clamp disc 6, the friction disc 8, and the friction washers 10 to adjustably press these parts against one another.

However, the conventional cymbal locating structure shown in FIGS. 1 and 2 can only be adjusted in its vertical angular position via the cymbal locating rod assembly 7. That is, the cymbal locating rod 9 and accordingly the cymbal (not shown) mounted thereto could not be adjusted to different horizontal orientations, unless the whole cymbal locating structure along with a stand thereof is lifted and turned to a desired horizontal orientation. It is no doubt time and effort consuming to do so. In view of the above problems, it is really necessary to improve the conventional cymbal locating structure to meet users' demands.

SUMMARY OF THE INVENTION

A primary object of the present invention is to provide a locating device applicable to a percussion cymbal, and the percussion cymbal locating device allows adjustment thereof in two axis directions at the same time, so that the cymbal mounted on the locating device can be adjusted to any vertical angle and any horizontal orientation according to a user's actual need.

Another object of the present invention is to provide a cymbal locating device that utilizes adjustable locking mechanisms instead of tooth-socket engagement design for a user to perform stepless fine adjustment of the horizontal orientation and the vertical angle of the cymbal.

A further object of the present invention is to provide a cymbal locating device that includes both an adjustable locking subassembly for pressing or loosening relevant parts of the cymbal locating device against or from one another and an adjustable auxiliary locking means for generally holding the cymbal location device in place when the adjustable locking subassembly loosens the relevant parts from one another, so that the cymbal mounted on the locating device is protected against undesirable falling off the locating device when the relevant parts are freely rotatable relative to one another.

To achieve the above and other objects, the present invention mainly includes a housing, a rotating mechanism, a rotating pole, a fixed pole, and an adjustable locking subassembly that together constitute a steplessly adjustable cymbal locating device allowing fine adjustment thereof through rotating in two axis directions.

The present invention is characterized in that the housing internally has a first receiving space and is provided on a surface with a notch communicable with the first receiving space; the rotating mechanism is clamped in the first receiving space of the housing with the housing selectively vertically rotatable relative to the rotating mechanism and internally has a second receiving space; the rotating pole is clamped in the second receiving space of the rotating mechanism with the rotating mechanism selectively horizontally rotatable relative to the rotating pole; the fixed pole is fixedly connected at an end to one side of the housing; and the adjustable locking subassembly is extended into the housing and the rotating mechanism, such that the housing, the rotating mechanism and the rotating pole are selectively pressed against one another to become immovable or loosened from one another to become adjustable.

In an operable embodiment, the housing of the present invention is assembled from a first clamp disc and a second clamp disc. The first clamp disc includes a fixed seat and has a fixed disk portion extended from one lateral side of the fixed seat, and the second clamp disc includes a movable seat correspondingly assembled to the fixed seat and has a movable disc portion extended from one lateral side of the movable seat corresponding to the fixed disc portion, such that the first receiving space is defined between the fixed and the movable disc portion and the notch is formed on an outer edge of the first receiving space.

Further, the housing also includes an adjustable auxiliary locking means extended through the fixed seat and the movable seat for finely adjusting a tightness relation among the fixed disc portion, the movable disc portion, and the rotating mechanism. In an operable embodiment, the adjustable auxiliary locking means includes a threaded bolt and a nut; the threaded bolt has an end extended through the movable seat and the fixed seat, and the nut is screwed onto the threaded bolt for tightening the fixed seat and the movable seat against each other. Further, the fixed seat is internally provided with an open slot for the movable seat to slidably fit therein, and a connector is projected from an outer end of the fixed seat for the fixed pole to connect thereto.

The rotating mechanism of the present invention includes a first rotating seat and a corresponding second rotating seat, and the first rotating seat and the second rotating seat are spaced from each other to form the second receiving space between them. And, the rotating pole has a portion located inside the second receiving space while the remaining portion of the rotating pole extends out of the housing via the notch.

In a preferred embodiment, the rotating mechanism further includes at least one recess provided on a contact area with the rotating pole, and a centering ring received in the recess for fitting on around the rotating pole. The rotating pole and the centering ring are correspondingly provided with at least one first through hole and at least one second through hole, respectively; and the first and second through holes are communicable with one another and have a pivot pin extended thereinto to lock the centering ring to the rotating pole.

The adjustable locking subassembly includes a screw rod having a first section extended into the housing and a second section exposed from the housing, and a first knob screwed to the second section. The first section further has a ring portion provided thereon for the rotating pole to rotatably extend therethrough. The first knob includes a rotating sleeve having internal threads and a handle substantially perpendicularly connected at an end to an outer end of the rotating sleeve; and the second section of the screw rod is correspondingly provided on an outer surface with external threads to mesh with the internal threads in the rotating sleeve.

To ensure that the housing and the rotating mechanism can be immovably pressed against or adjustably loosened from each other, the steplessly adjustable cymbal locating device of the present invention further includes at least one friction ring washer arranged between the housing and the rotating mechanism. Wherein, the friction ring washer consists of two semicircular washers made of an acrylonitrile butadiene styrene (ABS) material.

The fixed pole of the present invention has an end opposite to the housing with a cymbal clamper fitted therearound and a holding-down member connected thereto for pressing against a top of the cymbal clamper. In an operable embodiment, the cymbal clamper includes a locating sleeve fitted around the fixed pole and having a round flange radially outward extended from a bottom thereof, and two cymbal pads fitted around the locating sleeve; and the holding-down member is configured as a second knob screwed to the end of the fixed pole opposite to the housing, so that the two cymbal pads are located between the round flange and the second knob.

With the design of the rotating mechanism and the rotating pole in the housing, the cymbal locating device of the present invention advantageously provides adjustments in two axis directions, namely, in both vertical and horizontal directions, so that the cymbal can be conveniently adjusted to any desired horizontal orientation and any desired vertical angle. Further, since the housing, the rotating mechanism and the rotating pole of the cymbal locating device are releasably pressed against one another by the adjustable locking subassembly, it is able to achieve the effect of stepless fine adjustment of the horizontal orientation and the vertical angle of the cymbal.

Moreover, the cymbal locating device of the present invention may use the adjustable locking subassembly and the adjustable auxiliary locking means at the same time, so that the adjustable auxiliary locking means can generally hold the cymbal location device in place when the adjustable locking subassembly loosens the relevant parts from one another, and the cymbal mounted on the locating device is protected against undesirable falling off the locating device when the relevant parts are freely rotatable relative to one another.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
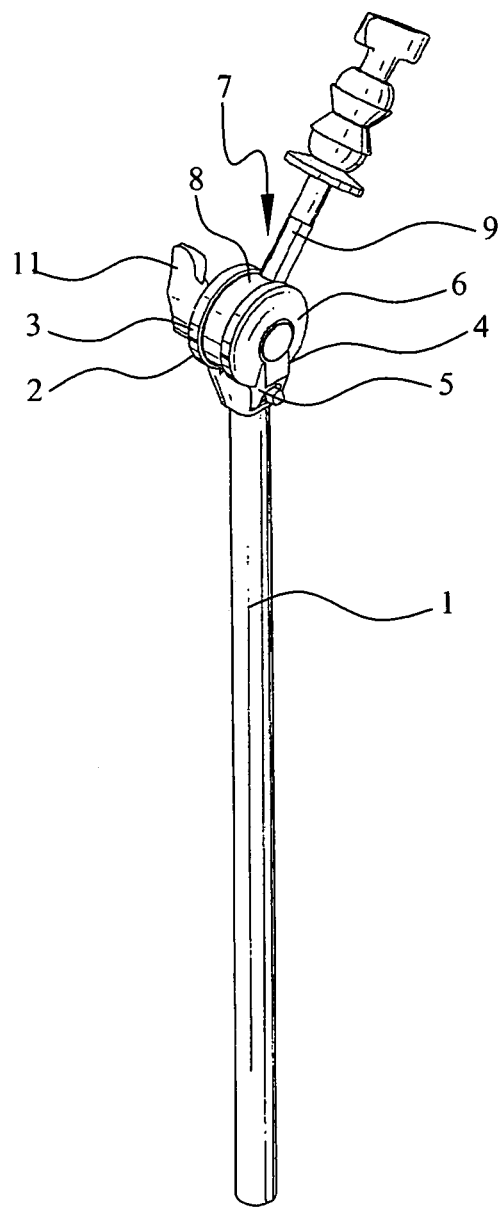
FIG. 1 is a perspective view of a conventional cymbal locating structure.
Figure 2:
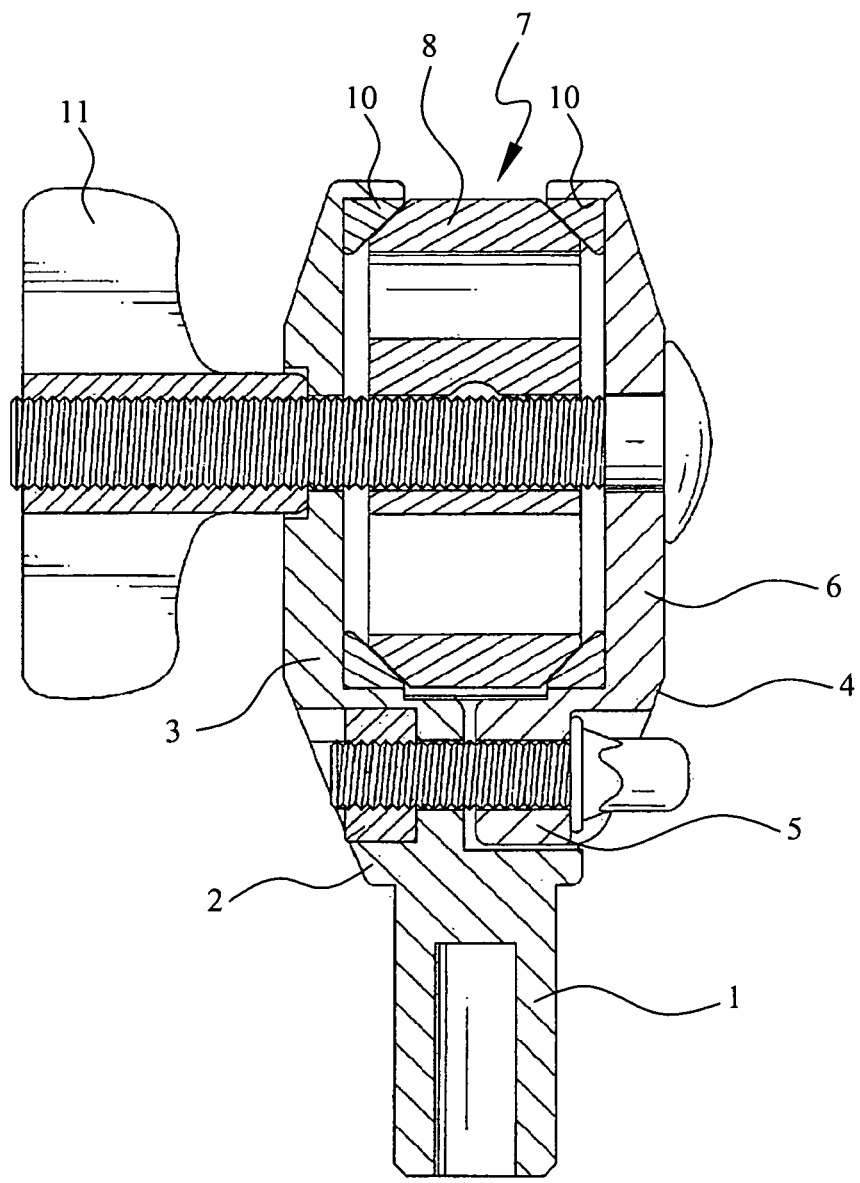
FIG. 2 is a fragmentary sectional view of FIG. 1.

The present invention will now be described with some preferred embodiments thereof and with reference to the accompanying drawings. For the purpose of easy to understand, elements that are the same in the preferred embodiments are denoted by the same reference numerals.

Figure 3:
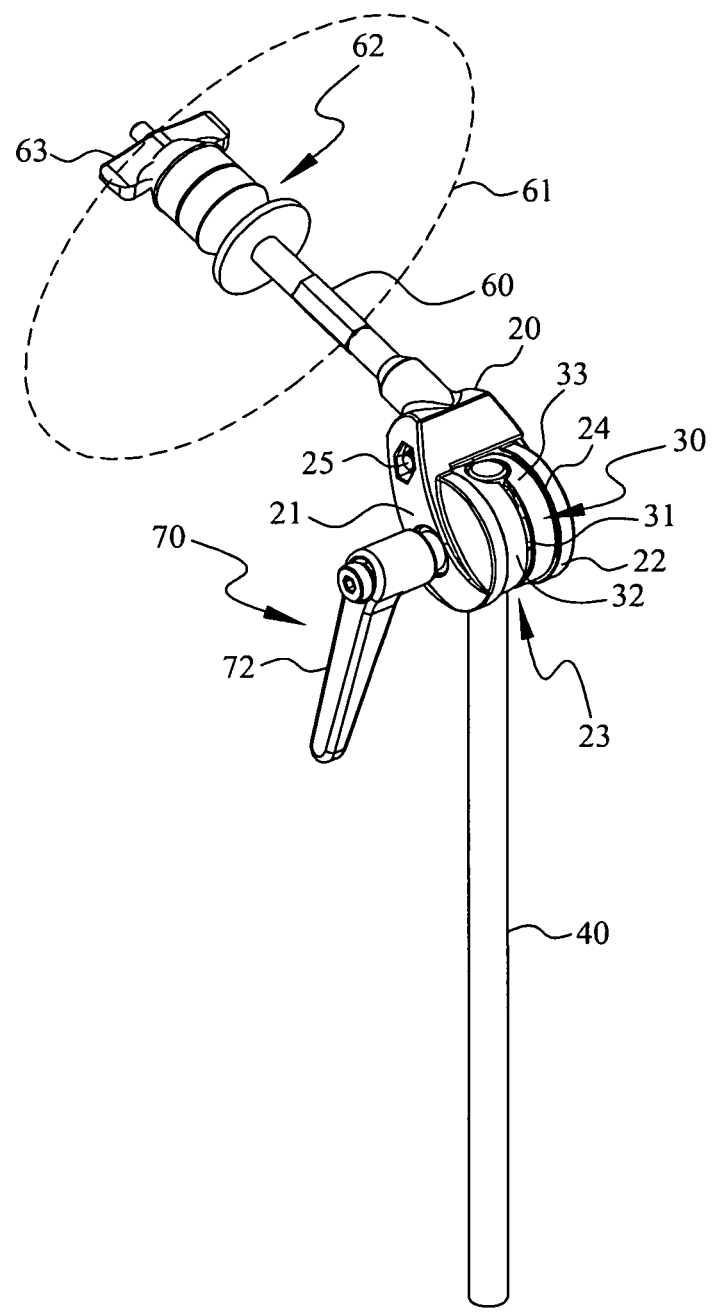
FIG. 3 is an assembled perspective view of a steplessly adjustable cymbal locating device according to a first preferred embodiment of the present invention.
Figure 4:
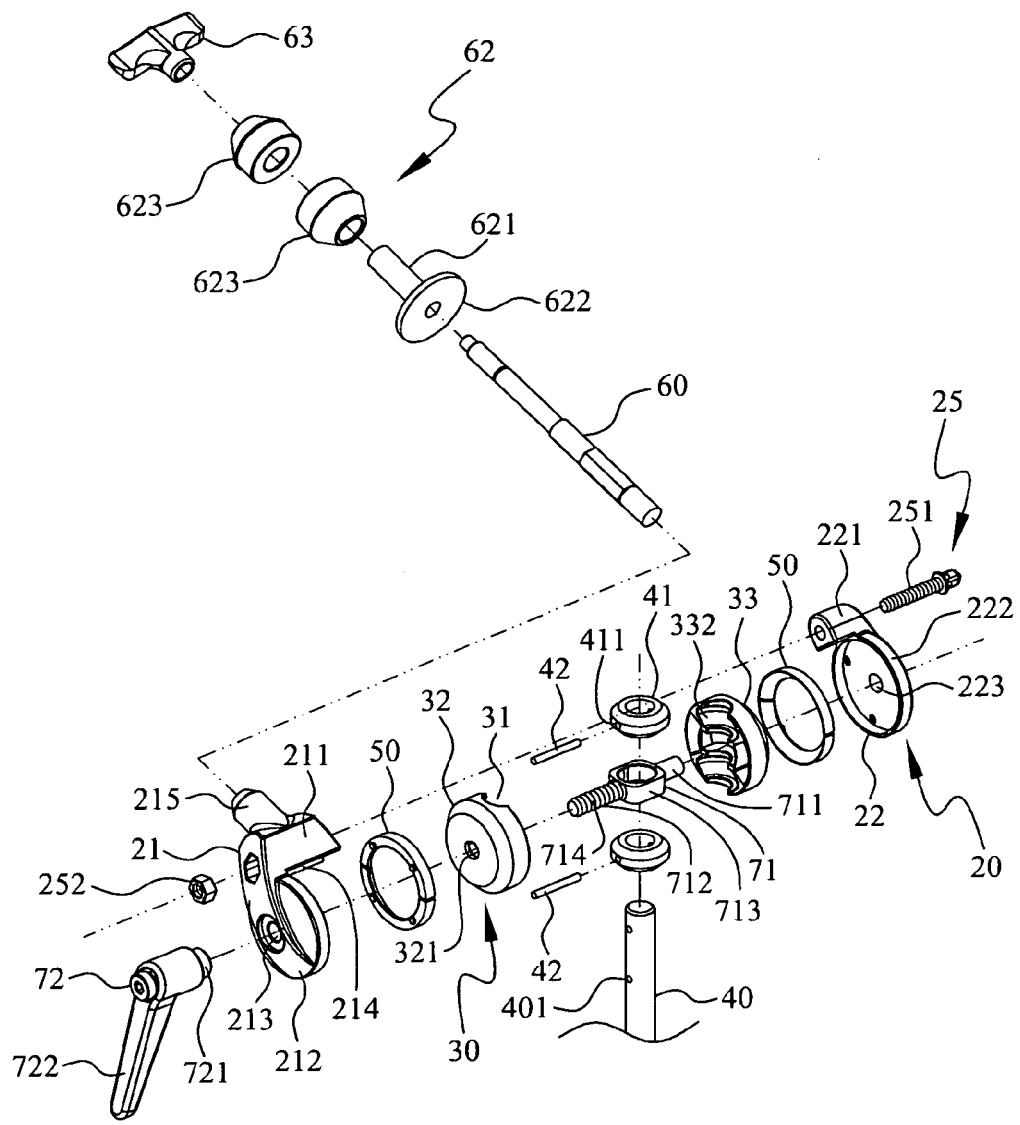
FIG. 4 an exploded view of FIG. 3.
Figure 5:
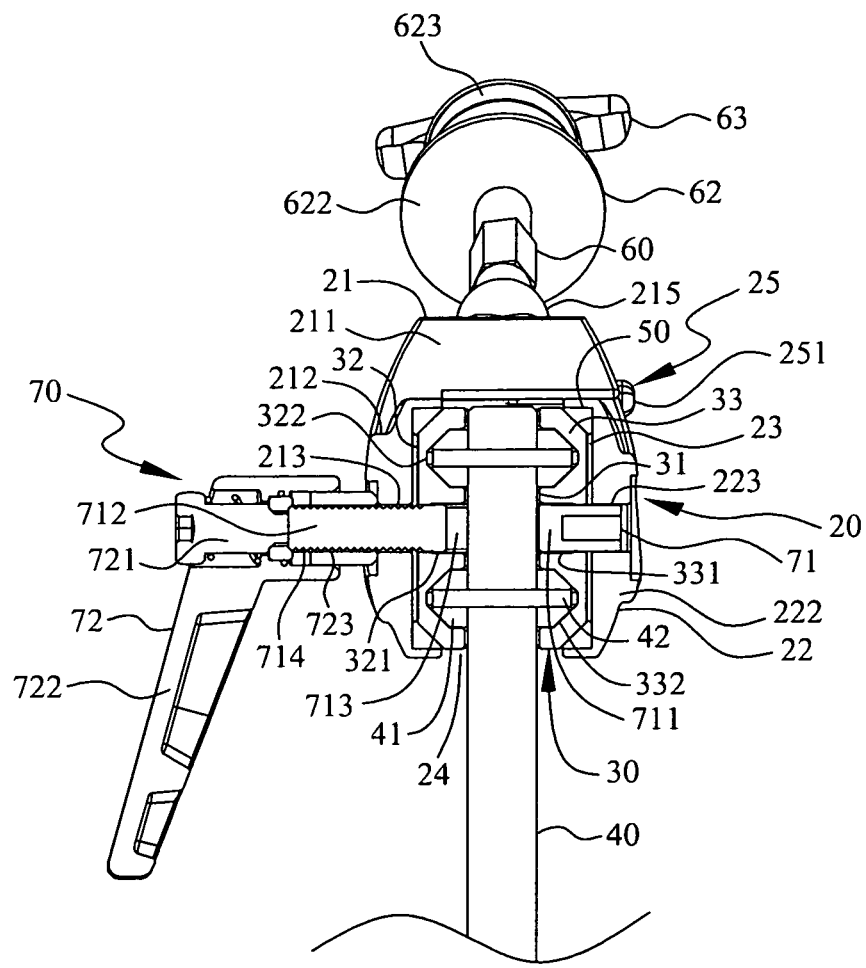
FIG. 5 is a sectional view of FIG. 3.

Please refer to FIGS. 3 to 5, in which a steplessly adjustable cymbal locating device according to a first preferred embodiment of the present invention is shown. The present invention is mainly used to set and hold a percussion cymbal unit to a desired position for use. As shown, the steplessly adjustable cymbal locating device in the first embodiment includes a housing 20, a rotating mechanism 30 providing vertical angle adjustment, a rotating pole 40 providing horizontal orientation adjustment and connected to a set of stand legs (not shown), at least one friction ring washer 50 arranged between the housing 20 and the rotating mechanism 30, a fixed pole 60 for holding a cymbal 61 thereto, and an adjustable locking subassembly 70 for tightening or loosening the housing 20, the rotating mechanism 30, the friction ring washers 50 and the rotating pole 40 to or from one another.

In the illustrated embodiment, the housing 20 is assembled from a first clamp disc 21 and a second clamp disc 22. The first clamp disc 21 includes a fixed seat 211, a fixed disk portion 212 extended from one lateral side of the fixed seat 211, a first aperture 213 formed on the fixed disk portion 212, an open slot 214 defined in the fixed seat 211, and a connector 215 projected from an outer side of the fixed seat 211.

The second clamp disc 22 includes a movable seat 221 correspondingly fitted in the open slot 214 to thereby assemble to the fixed seat 211, a movable disc portion 222 extended from on lateral side of the movable seat 221 to correspond to and cooperate with the fixed disc portion 212 to define a first receiving space 23 between them, and a second aperture 223 formed on the movable disc portion 222 corresponding to first aperture 213. The first receiving space 23 is formed on an outer edge with a notch 24.

In a preferred embodiment, the housing 20 further includes an adjustable auxiliary locking means 25, which includes a threaded bolt 251 and an adjusting nut 252. The threaded bolt 251 has an end extending through the fixed seat 211 and the movable seat 221, and the nut 252 is screwed onto the threaded bolt 251 for tightening the fixed seat 211 against the movable seat 221, so as to finely adjust a tightness relation among the first clamp disc 21, the second clamp disc 22, the friction ring washers 50, and the rotating mechanism 30. Therefore, even when the adjustable locking subassembly 70 is loosened from the cymbal locating device, the housing 20, the rotating mechanism 30 and the rotating pole 40 can still be held by the adjustable auxiliary locking means 25 to a substantially stable position without the risk of having loosely and freely rotatable rotating mechanism 30 and rotating pole 40 and accordingly, undesirable falling of the cymbal 61 off the locating device.

The rotating mechanism 30 has a second receiving space 31, and is clamped in the first receiving space 23 in the housing 20 with the housing 20 selectively rotatable relative to the rotating mechanism 30 in a parallel direction. In the illustrated preferred embodiment, the rotating mechanism 30 includes a first rotating seat 32 and a corresponding second rotating seat 33. The first rotating seat 32 and the second rotating seat 33 are spaced from each other to form the second receiving space 31 between them. The first rotating seat 32 is provided on a contact area with the rotating pole 40 with a third aperture 321 and two recesses 322 located at two opposite sides of the third aperture 321. The second rotating seat 33 is provided on a contact area with the rotating pole 40 with a fourth aperture 331 and two recesses 332 located at two opposite sides of the fourth aperture 331.

The rotating pole 40 has a portion located inside the second receiving space 31 while the remaining portion of the rotating pole 40 extends out of the housing 20 via the notch 24 by a predetermined length. Two centering rings 41 are further fitted on around the portion of the rotating pole 40 located inside the second receiving space 31. The two centering rings 41 are respectively received in a space defined by between two corresponding recesses 322, 332 provided on the first and the second rotating seat 32, 33, respectively, so as to prevent the rotating pole 40 from sliding out of the rotating mechanism 30 when the adjustable locking subassembly 70 is loosened. Furthermore, the rotating pole 40 and each of the centering rings 41 are correspondingly provided with at least one first through hole 401 and at least one second through hole 411, respectively. The corresponding first and second through holes 401, 411 are communicable with one another and a pivot pin 42 is extended thereinto to lock the centering ring 41 to the rotating pole 40.

With the design of the rotating mechanism 30 and the rotating pole 40 in the housing 20, the cymbal locating device of the present invention provides adjustments in two axis directions, that is, in both vertical and horizontal directions, so that the cymbal 61 can be conveniently adjusted to any desired horizontal orientation and any desired vertical angle.

In the illustrated preferred embodiment, one of the friction ring washers 50 is arranged between the fixed disc portion 212 and the first rotating seat 32, while the other one between the movable disc portion 222 and the second rotating seat 33. Further, each of the friction ring washers 50 consists of two semicircular washers made of an acrylonitrile butadiene styrene (ABS) material. The friction washers 50 provide frictional forces, which advantageously replace the conventional engagement of teeth with tooth sockets.

The fixed pole 60 has an inner end connected to the connector 215 on the housing 20, and another outer end having a cymbal clamper 62 fitted therearound for a cymbal 61 to mount thereto. A holding-down member 63 is connected to the outer end of the fixed pole 60 to press against a top of the cymbal clamper 62. In the illustrated preferred embodiment, the cymbal clamper 62 includes a locating sleeve 621 fitted around the outer end of the fixed pole 60 and having a round flange 622 radially extended from a bottom thereof, and two cymbal pads 623 fitted around the locating sleeve 621 for clamping the cymbal 61 between them. The holding-down member 63 is configured as a second knob screwed to the outer end of the fixed pole 60.

The adjustable locking subassembly 70 extends through the housing 20 and the rotating mechanism 30 to connect them to each other in a releasable pressing manner, so as to effect stepless fine adjustment of the horizontal orientation and vertical angle of the cymbal 61. In the illustrated preferred embodiment, the adjustable locking subassembly 70 includes a screw rod 71 having a first section 711 extended into the housing 20 and a second section exposed from the housing 20. The first section 711 has a ring portion 713 provided thereon to engage with the rotating pole 40; and two opposite ends of the first section 711 laterally outward project from the ring portion 713 to extend through the third aperture 321 and the first aperture 213 as well as the fourth aperture 331 and the second aperture 223, respectively. The second section 712 has an end opposite to the first section 711 screwed to a first knob 72. The first knob 72 includes a rotating sleeve 721 having internal threads 723, and a handle 722 substantially perpendicularly connected at an end to an outer end of the rotating sleeve 721. And, the second section 712 is correspondingly provided on an outer surface with external threads 714 to mesh with the internal threads 723.

Figure 6:
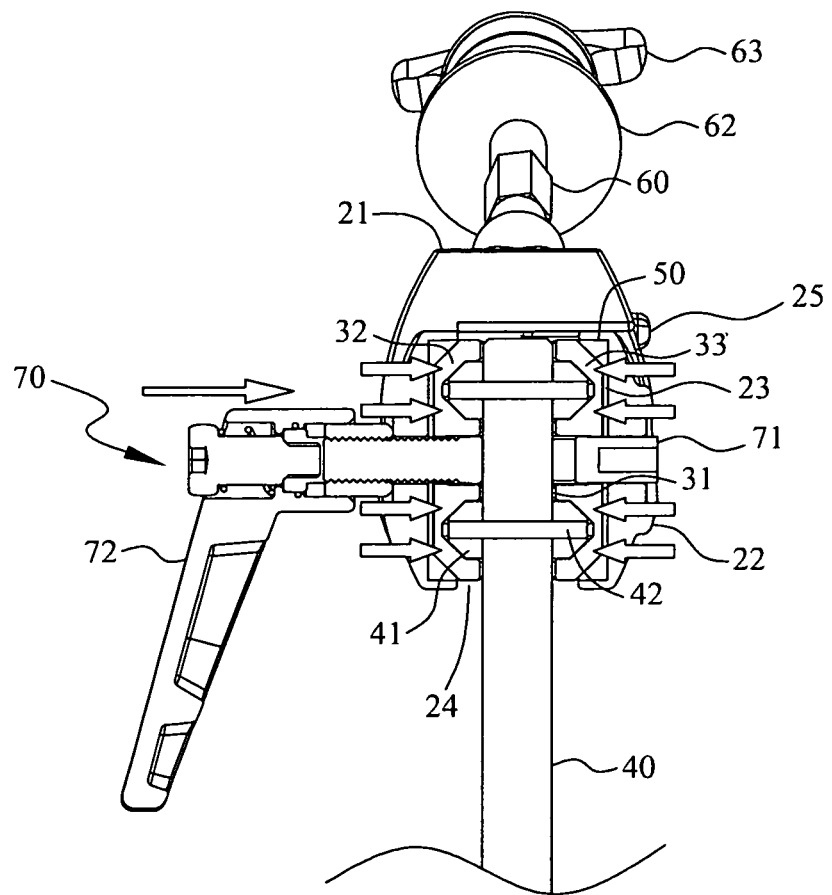
FIG. 6 shows the present invention when an adjustable locking subassembly thereof is turned to a pressing position.
Figure 7:
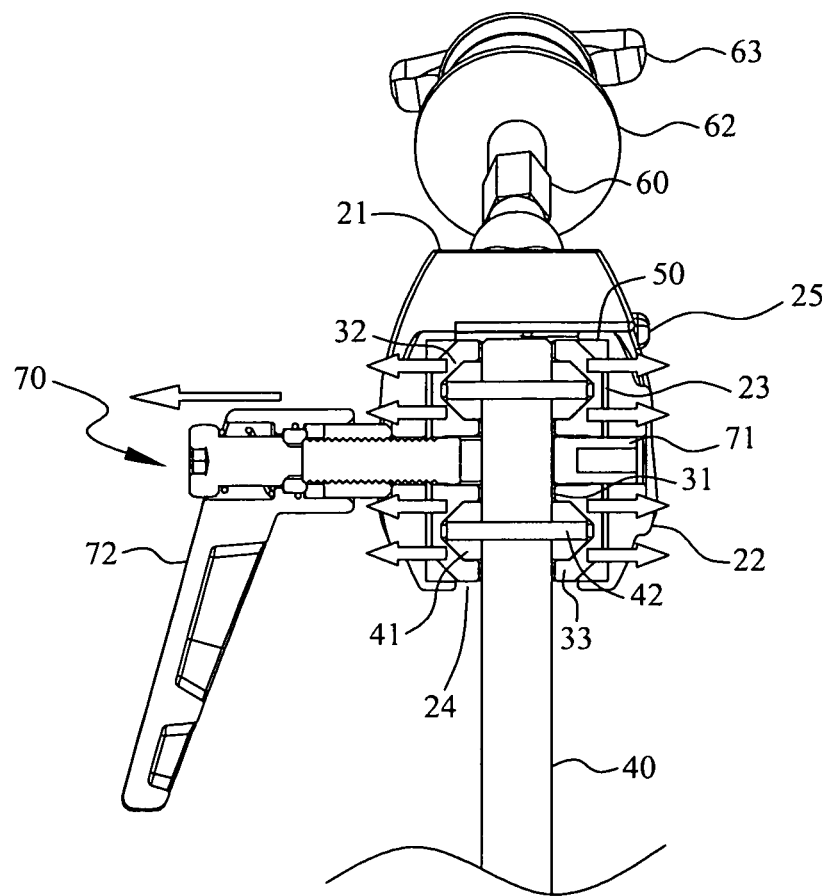
FIG. 7 shows the present invention when the adjustable lock subassembly is turned to a loosening position.
Figure 8:
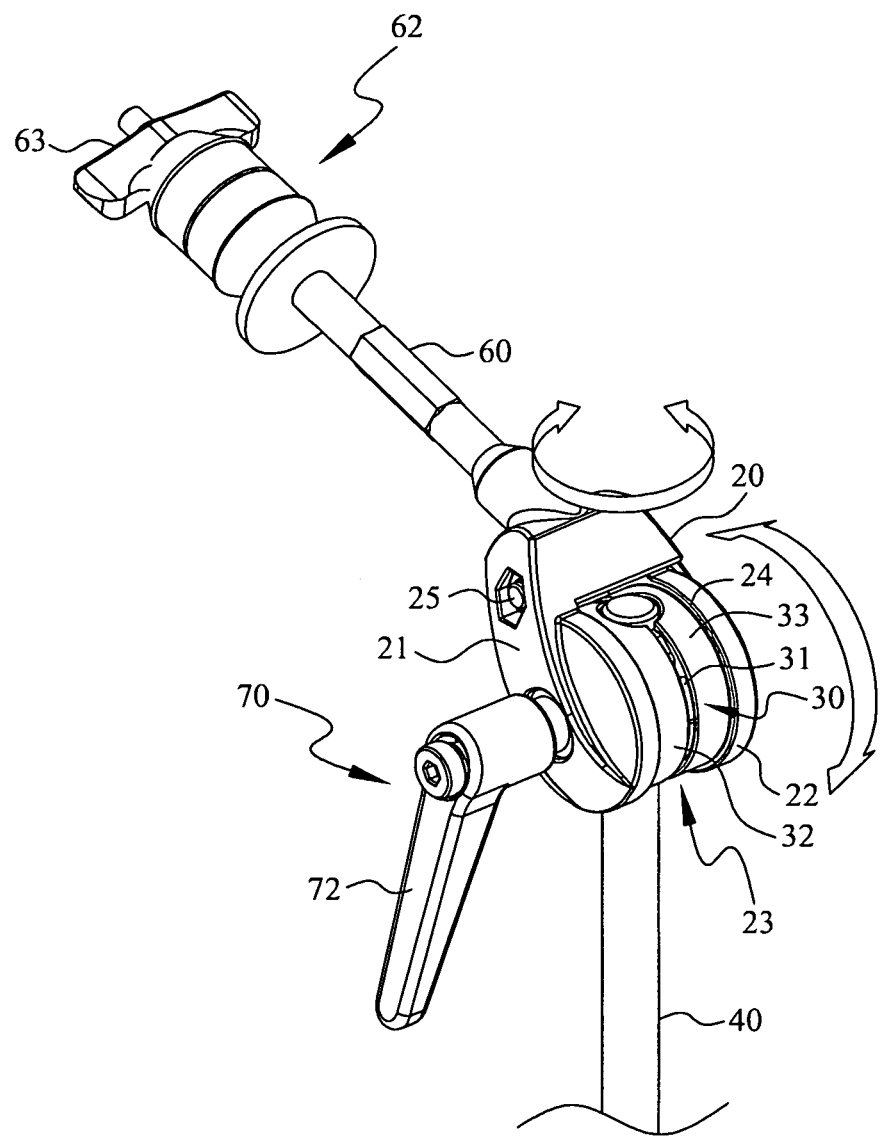
FIG. 8 shows the manner in which the steplessly adjustable cymbal locating device of FIG. 3 is adjusted to different horizontal orientations and vertical angles.

Please refer to FIG. 6. When the adjustable locking subassembly 70 is turned inward to a pressing position, the first clamp disc 21 and the second clamp disc 22 are driven inward to press against each other, such that the rotating mechanism 30 and the rotating pole 40 are simultaneously subjected to forces externally applied thereto and become immovably clamped between the first and second clamp discs 21, 22. On the other hand, as shown in FIGS. 7 and 8, when the adjustable locking subassembly 70 is turned outward to a loosening position, the first clamp disc 21 and the second clamp disc 22 are allowed to slightly move outward away from each other, such that the rotating mechanism 30 and the rotating pole 40 are no longer subjected to the externally applied clamping forces and become rotatable relative to each other. At this point, the housing 20 can be rotated vertically relative to the rotating mechanism 30 and bring the fixed pole 60 to different vertical angles, and the rotating mechanism 30 can be horizontally rotated relative to the rotating pole 40 to adjust the fixed pole 60 to different horizontal orientations.

Figure 9:
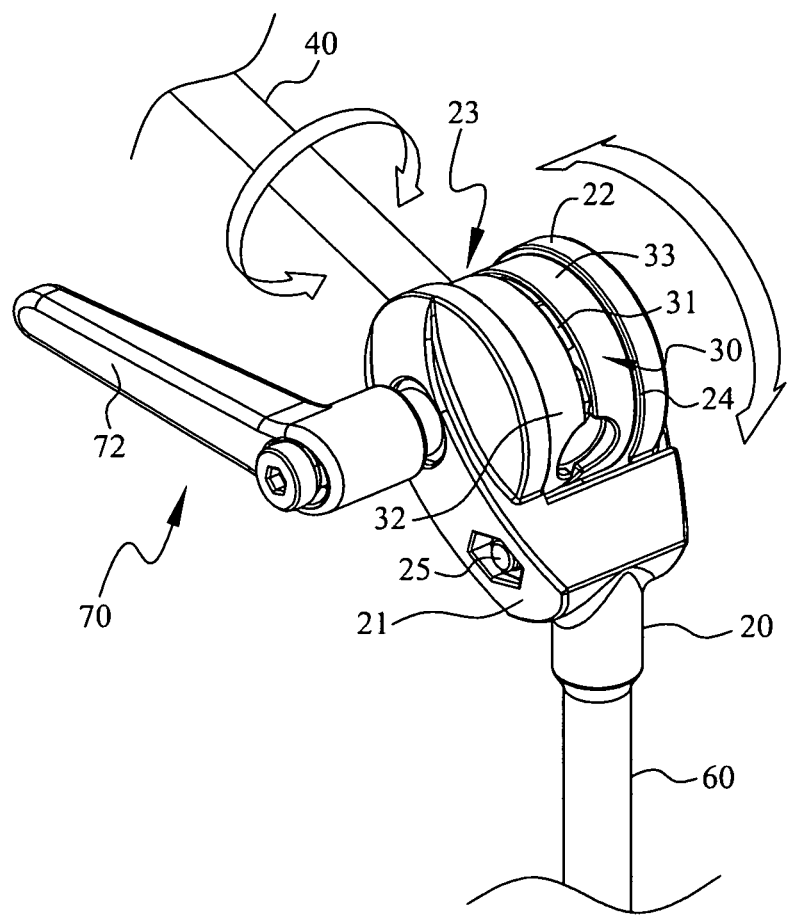
FIG. 9 shows the manner in which a steplessly adjustable cymbal locating device according to a second preferred embodiment of the present invention is adjusted to different horizontal orientations and vertical angles.

Please refer to FIG. 9 that shows a second preferred embodiment of the present invention. Compared to the first embodiment, the rotating pole 40 and the fixed pole 60 in the second embodiment are exchanged in their positions relative to the housing 20. That is, the rotating pole 40 is now used with other supporting members (not shown) to hold the percussion cymbal 61 thereto, and the fixed pole 60 is now assembled to the stand legs (not shown) to maintain an upright position. Since the structural configurations and the connecting or assembling relations of the housing 20, the rotating mechanism 30, the rotating pole 40, the fixed pole 60, the friction ring washers 50 and the adjustable locking subassembly 70 to one another are the same as those in the first preferred embodiment, they are not repeatedly described herein.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A steplessly adjustable cymbal locating device, comprising:
   a housing including a notch and internally having a first receiving space, the first receiving space being provided on a surface with the notch communicable with the first receiving space;
   a rotating mechanism being clamped in the first receiving space of the housing with the housing selectively rotatable relative to the rotating mechanism, and the rotating mechanism internally having a second receiving space;
   a rotating pole being clamped in the second receiving space of the rotating mechanism with the rotating mechanism selectively rotatable relative to the rotating pole; and
   an adjustable locking subassembly being extended into the housing and the rotating mechanism to be selectively movable between
      a first position to press the housing, the rotating mechanism and the rotating pole against one another synchronously so as to be immovable relative to one another, and
      a second position to adjustably loosen the housing, the rotating mechanism and the rotating pole from one another synchronously;
   wherein the housing is rotatable vertically relative to the rotating mechanism to adjust the housing to different vertical angles, and the rotating mechanism is horizontally rotatable relative to the rotating pole to adjust the housing to different horizontal orientations.

2. The steplessly adjustable cymbal locating device as claimed in claim 1, wherein the housing is assembled from a first clamp disc and a second clamp disc;
   the first clamp disc including a fixed seat and having a fixed disc portion extended from one lateral side of the fixed seat; and
   the second clamp disc including a movable seat correspondingly assembled to the fixed seat and having a movable disc portion extended from one lateral side of the movable seat to face toward the fixed disc portion, such that the first receiving space is defined between the fixed and the movable disc portions and the notch is formed on an outer edge of the first receiving space.

3. The steplessly adjustable cymbal locating device as claimed in claim 2, wherein the housing further includes an adjustable auxiliary locking means extended through the fixed seat and the movable seat for finely adjusting a tightness relation among the first clamp disc, the second clamp disc, and the rotating mechanism.

4. The steplessly adjustable cymbal locating device as claimed in claim 3, wherein the adjustable auxiliary locking means includes a threaded bolt and a nut;
   the threaded bolt having an end extended through the movable seat and the fixed seat, and the nut being screwed onto the threaded bolt for tightening the fixed disc portion against the movable disc portion.

5. The steplessly adjustable cymbal locating device as claimed in claim 1, wherein the rotating mechanism includes a first rotating seat and a corresponding second rotating seat, and the first rotating seat and the second rotating seat being spaced from each other to form the second receiving space between them.

6. The steplessly adjustable cymbal locating device as claimed in claim 1, wherein the rotating pole has a portion located inside the second receiving space while the remaining portion of the rotating pole extends out of the housing via the notch.

7. The steplessly adjustable cymbal locating device as claimed in claim 1, wherein the rotating mechanism further includes at least one recess provided on a contact area with the rotating pole, and a centering ring received in the at least one recess for fitting on and around the rotating pole.

8. The steplessly adjustable cymbal locating device as claimed in claim 7, further comprising a pivot pin, wherein the rotating pole and the centering ring are correspondingly provided with at least one first through hole and at least one second through hole, respectively; and the at least one first through hole being communicable with the at least one second through hole, the at least one first through hole and the at least one second through hole having the pivot pin extended thereinto.

9. The steplessly adjustable cymbal locating device as claimed in claim 1, wherein the adjustable locking subassembly includes
   a screw rod having a first section extended into the housing and a second section exposed from the housing, and
   a first knob screwed to the second section.

10. The steplessly adjustable cymbal locating device as claimed in claim 9, wherein the first section further has a ring portion provided thereon for the rotating pole to rotatably extend therethrough.

11. The steplessly adjustable cymbal locating device as claimed in claim 9, wherein the first knob includes a rotating sleeve having internal threads and a handle substantially perpendicularly connected at an end thereof to an outer end of the rotating sleeve; and
   the second section of the screw rod being correspondingly provided on an outer surface thereof with external threads to mesh with the internal threads.

12. The steplessly adjustable cymbal locating device as claimed in claim 1, further comprising at least one friction ring washer arranged between the housing and the rotating mechanism.

13. The steplessly adjustable cymbal locating device as claimed in claim 12, wherein the at least one friction ring washer consists of two semicircular washers.

14. The steplessly adjustable cymbal locating device as claimed in claim 1, further comprising a fixed pole having an end connected to the housing.

15. The steplessly adjustable cymbal locating device as claimed in claim 14, further comprising:
   a holding-down member; and
   a cymbal clamper,
   wherein the fixed pole has another end opposite to the housing having the cymbal clamper fitted therearound and the holding-down member connected the another end for pressing against a top of the cymbal clamper.

16. The steplessly adjustable cymbal locating device as claimed in claim 15, wherein the cymbal clamper includes a locating sleeve fitted around the fixed pole and having a round flange radially outward extended from a bottom thereof, and two cymbal pads fitted around the locating sleeve; and the holding-down member being configured as a second knob screwed to said another end of the fixed pole, so that the two cymbal pads are located between the round flange and the second knob.

\* \* \* \* \*